(12) United States Patent
Hund

(10) Patent No.: US 12,163,866 B2
(45) Date of Patent: Dec. 10, 2024

(54) ADAPTER PART FOR CONNECTING A MEDICAL HOLLOW BODY TO A TENSION/COMPRESSION MEASURING DEVICE, TEST ASSEMBLY, METHOD FOR TESTING A TIGHTNESS OF A MEDICAL HOLLOW BODY, AND USE OF A TENSION/COMPRESSION MEASURING DEVICE

(71) Applicant: Vetter Pharma-Fertigung GmbH & Co. KG, Ravensburg (DE)

(72) Inventor: Petra Hund, Ravensburg/Berg (DE)

(73) Assignee: Vetter Pharma-Fertigung GmbH & Co. KG, Ravensburg (DE)

(*) Notice: Subject to any disclaimer, the term of this patent is extended or adjusted under 35 U.S.C. 154(b) by 58 days.

(21) Appl. No.: 17/602,449

(22) PCT Filed: Apr. 6, 2020

(86) PCT No.: PCT/EP2020/059818
§ 371 (c)(1),
(2) Date: Oct. 8, 2021

(87) PCT Pub. No.: WO2020/207987
PCT Pub. Date: Oct. 15, 2020

(65) Prior Publication Data
US 2022/0214242 A1 Jul. 7, 2022

(30) Foreign Application Priority Data
Apr. 8, 2019 (DE) .......................... 102019205025.5

(51) Int. Cl.
*G01M 3/32* (2006.01)

(52) U.S. Cl.
CPC ........ *G01M 3/3272* (2013.01); *G01M 3/3209* (2013.01); *G01M 3/329* (2013.01)

(58) Field of Classification Search
CPC ...... G01M 3/02; G01M 3/229; G01M 3/3209; G01M 3/3272; G01M 3/3236; G01M 3/3281; G01M 3/329; G01M 3/34
See application file for complete search history.

(56) References Cited

U.S. PATENT DOCUMENTS 3,762,213 A * 10/1973 Nowicki ................. G01M 3/34
73/49.2
3,805,594 A * 4/1974 Hayashi ................... G01N 3/12
73/37

(Continued)

FOREIGN PATENT DOCUMENTS

| CN | 208313519 U | 1/2019 |
|---|---|---|
| DE | 3044550 A1 | 6/1982 |

(Continued)

*Primary Examiner* — Natalie Huls
(74) *Attorney, Agent, or Firm* — Sheppard Mullin Richter & Hampton LLP

(57) ABSTRACT

The invention relates to an adapter part (9) for connecting a medical hollow body (11) to a tension/compression measuring device (3), comprising a first connecting end (13), which is designed to connect the adapter part (9) to an interior (15) of a medical hollow body (11) in a fluid-tight manner, and comprising a second connecting end (17), which has a pressure chamber (19) and is designed to operatively connect the adapter part (9) to a tension/compression measuring device (3), so that a pressure in the pressure chamber (19) can be adjusted by means of the tension/compression measuring device (3), a hollow channel (21) passing through the adapter part (9) from the pressure chamber (19) to the first connecting end (13).

15 Claims, 2 Drawing Sheets

(56) References Cited

U.S. PATENT DOCUMENTS

| | | | | |
|---|---|---|---|---|
| 4,090,394 | A * | 5/1978 | Herman | G01N 3/12 |
| | | | | 73/49.4 |
| 4,144,742 | A * | 3/1979 | Schmidt | G01N 3/12 |
| | | | | 141/105 |
| 4,285,230 | A * | 8/1981 | Hartness | G01N 3/12 |
| | | | | 73/49.4 |
| 4,768,372 | A * | 9/1988 | Lehmann | B07C 5/3408 |
| | | | | 73/825 |
| 5,571,949 | A * | 11/1996 | MacLaughlin | G01M 3/3209 |
| | | | | 73/41 |
| 6,826,957 | B2 * | 12/2004 | Martone | G01M 3/3236 |
| | | | | 73/497 |
| 11,389,599 | B2 * | 7/2022 | Vogt | G01M 3/205 |
| 2005/0268700 | A1 * | 12/2005 | Strand | G01M 3/366 |
| | | | | 198/341.03 |
| 2013/0041241 | A1 | 2/2013 | Felts et al. | |
| 2014/0290344 | A1 * | 10/2014 | Bonfiglioli | G01M 3/3209 |
| | | | | 73/49.3 |

FOREIGN PATENT DOCUMENTS

| | | |
|---|---|---|
| JP | 3151843 U | 7/2009 |
| JP | 4720131 B2 | 7/2011 |
| JP | 2011-193984 A | 10/2011 |
| WO | 2008012611 A2 | 1/2008 |
| WO | 2019053113 A1 | 3/2019 |

* cited by examiner

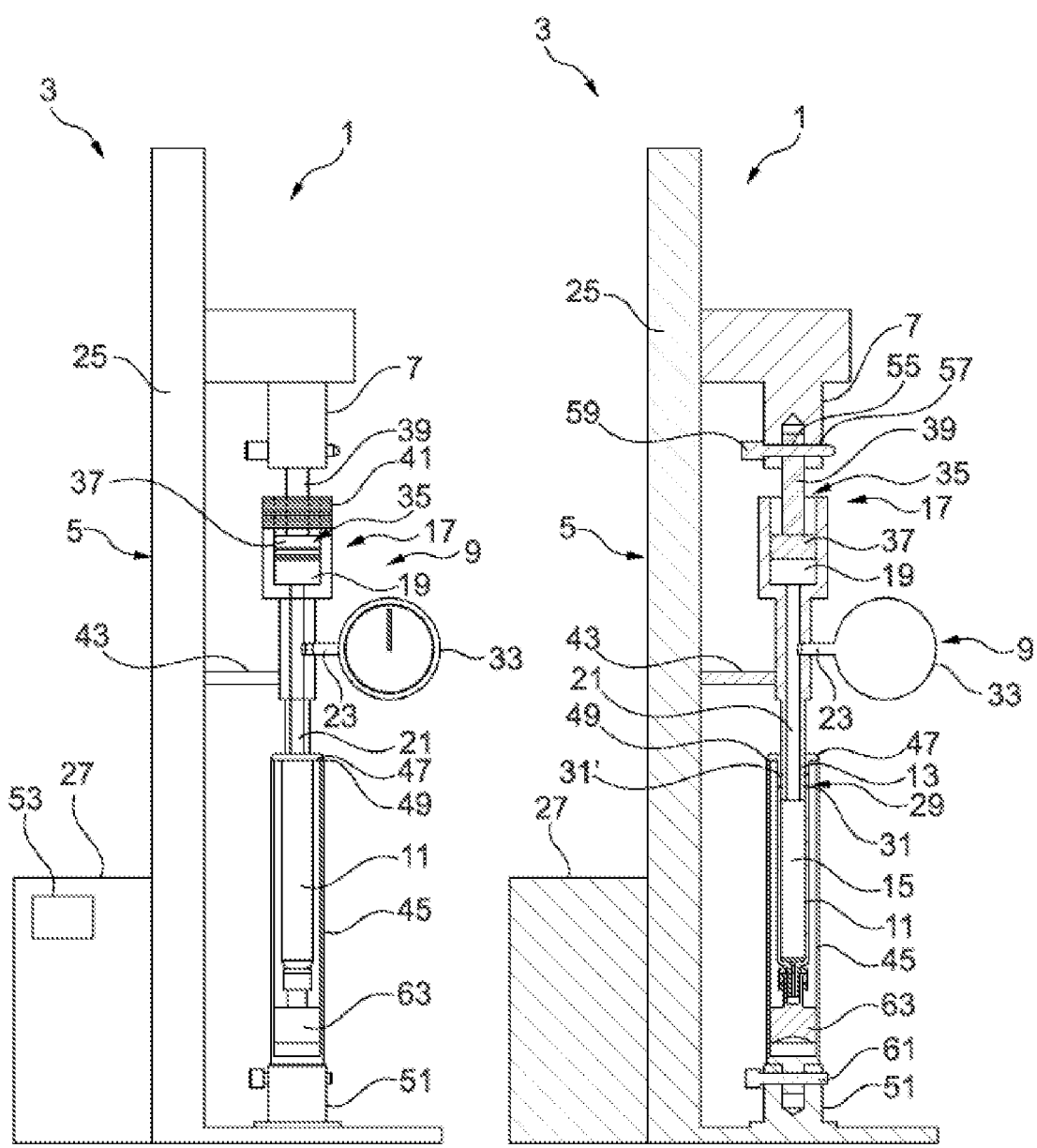

ADAPTER PART FOR CONNECTING A MEDICAL HOLLOW BODY TO A TENSION/COMPRESSION MEASURING DEVICE, TEST ASSEMBLY, METHOD FOR TESTING A TIGHTNESS OF A MEDICAL HOLLOW BODY, AND USE OF A TENSION/COMPRESSION MEASURING DEVICE

CROSS REFERENCE TO RELATED APPLICATIONS

This application is a U.S. National Stage Application under 35 U.S.C. 371 of International Application No. PCT/EP2020/059818, filed Apr. 6, 2020, which claims priority to German Patent Application No. 10 2019 205 025.5, filed Apr. 8, 2019. The contents of each of the aforementioned are hereby incorporated by reference in their entirety into the present disclosure.

The invention relates to an adapter part for connecting a medical hollow body to a tension/compression measuring device, to a test assembly having a tension/compression measuring device and such an adapter part, to a method for testing a tightness of a medical hollow body using such an adapter part, and to the use of a tension/compression measuring device for testing a tightness of a medical hollow body.

In the case of medical hollow bodies, in particular medical hollow bodies provided for later distribution that are pre-filled with a pharmaceutical, in particular syringes and carpules, but also in the case of connecting pieces, adapters or the like, there is a need to test tightness. For this purpose, there are standardized tightness tests, which, in particular, stipulate that a certain overpressure or underpressure must be maintained for a predetermined time in the interior of such a medical hollow body without leakage. Of course, it is possible to provide dedicated devices designed specifically for carrying out corresponding tightness tests, but this is complex and expensive. It is also possible to carry out such tightness tests by hand with a low degree of automation; however, this is time-consuming and labor-intensive and also imprecise. There is therefore a need to be able to carry out such tightness tests on the one hand by means of devices/apparatuses that also allow other uses and are, if possible, already used in the development and/or testing of medical hollow bodies, and on the other hand to achieve the highest possible degree of automation for such a tightness test.

The invention is based on the object of creating an adapter part for connecting a medical hollow body to a tension/compression measuring device, a test assembly having a tension/compression measuring device and such an adapter part, a method for testing a tightness of a medical hollow body using such an adapter part, and a use of a tension/compression measuring device for testing a tightness of a medical hollow body in which the disadvantages mentioned do not occur, and in which at least one of the advantages mentioned is preferably realized at least in part.

The object is achieved in that the present technical teaching is provided, in particular the teaching of the independent claims and the embodiments disclosed in the dependent claims and the description.

The object is achieved in particular in that an adapter part is created, which is designed to connect a medical hollow body to a tension/compression measuring device, the adapter part having a first connecting end, which is designed to connect the adapter part to an interior of a medical hollow body in a fluid-tight manner. The adapter part also has a second connecting end, the second connecting end having a pressure chamber and being designed to bring the adapter part into operative connection with a tension/compression measuring device, such that a pressure in the pressure chamber can be adjusted by means of the tension/compression measuring device. The adapter part also has a hollow channel, which passes through said adapter part from the pressure chamber to the first connecting end. In particular, the hollow channel is open at the first connecting end, i.e. the hollow channel opens at the first connecting end to an external environment of the adapter part, or the hollow channel opens into the first connecting end. In particular, the adapter part is open at the first connecting end, the hollow channel being accessible from the first connecting end. The result is that the pressure in the interior of the medical hollow body can be adjusted by means of the tension/compression measuring device, in particular by controlling the tension/compression measuring device, in that the pressure in the pressure chamber can be adjusted by means of the tension/compression measuring device, the hollow channel being connected to the pressure chamber in a fluidic manner and at the same time being able to open at the first connecting end into the interior of a hollow body connected to the adapter part in a fluid-tight manner. It is then possible to record, in particular measure, the pressure in the hollow channel, the pressure chamber and/or in the interior of the medical hollow body. The adapter part thus opens up the possibility of using a tension/compression measuring device to carry out tightness tests on medical hollow bodies. Such tension/compression measuring devices are typically already present in the development/testing of medical hollow bodies and are used there in particular to test, for example, displacement forces of stoppers that are displaceably arranged in the interior of such a medical hollow body. A device can therefore be used to carry out the tightness test, which device can on the one hand also be used for other purposes and is typically already available on the other hand. Furthermore, it is possible to operate such a tension/compression measuring device at least largely in an automated manner, so that a tightness test that is carried out with the aid of such a tension/compression measuring device can ultimately also be at least largely automated.

A medical hollow body is understood here in particular to be a hollow body, which is selected from a group consisting of a vessel for pharmaceutical substances, in particular for medical active ingredients and/or adjuvants; a syringe; a carpule; a connecting piece, in particular a needleless connecting piece, in particular a Luer connecting piece, in particular having a Luer connector or having a plurality of Luer connectors, in particular a connecting piece having a small diameter according to the ISO 80369 family of standards, in particular DIN EN ISO 80369-7, in the version applicable on the date determining the priority of the present property right, in particular DIN EN ISO 80369-7:2017-10; and an adapter, in particular a Luer adapter, in particular having a Luer connector or having a plurality of Luer connectors, in particular an infusion adapter. In particular, a medical hollow body is a part or vessel that has a cavity that can be closed at two ends by closures and/or stoppers and is preferably closed as intended. In particular, such a medical hollow body is a syringe or a carpule.

In particular, a tightness test is carried out on such a medical hollow body by closing a first, preferably distal end of the medical hollow body with a closure or stopper, a specific pressure being set in the interior of the hollow body via a second, preferably proximal, still open end and being recorded over a certain period of time.

A pressure measuring device can also be connected to the first, preferably distal end of the medical hollow body in order to record, in particular to measure, the pressure in the interior of the medical hollow body—and thus at the same time the pressure in the hollow channel.

A distal end is understood here in particular to be an end of the medical hollow body that, when the medical hollow body is used, faces toward a patient and/or an injection site and preferably faces away from a user of the medical hollow body as intended. The other end of the medical hollow body is referred to as the proximal end.

A tension/compression measuring device is understood to be, in particular, a device that is designed to apply tensile or compressive forces to test bodies, in particular to, preferably additionally, measure tensile or compressive forces on test bodies. Such a tension/compression measuring device has, in particular, a standing body and a working end that can be displaced in the axial direction relative to the standing body. The working end is preferably designed as a measuring slide that can be displaced on a measuring tower. By displacing the working end relative to a test body, tensile or compressive forces can be introduced into the test body.

In particular, a tension/compression measuring device is preferably understood to be a device that is designed to apply tensile or compressive forces to test bodies, in particular to, preferably additionally, measure tensile and compressive forces on test bodies.

In particular, the tension/compression measuring device is preferably designed to apply mechanical tensile and/or compressive forces to test bodies, and preferably to measure mechanical tensile and/or compressive forces on test bodies.

A fluid-tight connection of the adapter part to the interior of the medical hollow body is understood in particular to mean that the adapter part is connected to the medical hollow body via the first connecting end in such a way that a pressure adjustment in the interior of the medical hollow body via the adapter part is possible without leakage in the region of the connection of the first working end to the medical hollow body. In this case, it is sufficient if the connection of the adapter part to the medical hollow body is designed in such a way that, at pressures such as those that are necessary or prescribed for the intended tightness tests, no leakage, or at least no leakage that impairs the tightness test, occurs. It is possible, but not absolutely necessary, for the connection also to be fluid-tight, i.e. free of leakage even at higher pressure differences.

The first connecting end preferably has a sealing device for the fluid-tight connection to the medical hollow body. In a preferred embodiment, the sealing device has at least one sealing element, in particular at least one sealing ring, particularly preferably two sealing elements, in particular two sealing rings preferably arranged at a distance from one another. The sealing device is preferably arranged on an outer circumferential wall of the first connecting end and, when installed, cooperates in a sealing manner with an inner wall of the hollow body.

A positive connection of the first connecting end to the medical hollow body is also possible, for example via a Luer cone having a thread.

By means of the tension/compression measuring device, a pressure in the pressure chamber can be adjusted in particular if the first connecting end is connected to the medical hollow body in a fluid-tight manner and at the same time the second connecting end is operatively connected to the tension/compression measuring device. A suitable fluid is preferably used to build up pressure, in particular a gas or a liquid, for example air, nitrogen, carbon dioxide, a noble gas, water, a pharmaceutical oil or fat or the like.

By means of the tension/compression measuring device, an overpressure, for example of approx. 300 kPa, or an underpressure, for example 40 kPa, can be set in the pressure chamber in particular—relative to an ambient pressure, in particular a normal pressure, in particular 1013 mbar. Thus, tightness tests that require the setting of an overpressure and tightness tests that require the setting of an underpressure can both be carried out.

According to a further development of the invention, it is provided that the adapter part has a pressure measuring channel, which branches off from the hollow channel or the pressure chamber between the first connecting end and the second connecting end. The pressure measuring channel is thus in fluidic communication with the hollow channel and the pressure chamber between the first connecting end and the second connecting end, in particular between the first connecting end and the pressure chamber. In particular, the pressure measuring channel branches off from the hollow channel between the first connecting end and the pressure chamber. In particular via the pressure measuring channel, there is then the possibility, in a particularly simple manner, of recording, in particular measuring, the pressure in the hollow channel, the pressure chamber, and thus at the same time the pressure in the interior of the medical hollow body.

According to a further development of the invention, it is provided that the pressure measuring channel is designed to arrange a pressure measuring device on the pressure measuring channel. Thus, it is advantageously possible—in particular in a simple manner—to connect a pressure measuring device to the pressure measuring channel, in particular in a fluidic manner, in order to determine the pressure in the pressure measuring channel and thus at the same time the hollow channel, the pressure chamber and the medical hollow body. The pressure measuring channel preferably has a thread or a thread is assigned to the pressure measuring channel, it being possible for the pressure measuring device to be screwed to the thread. This represents a particularly simple and easily producible connection between the pressure measuring device and the pressure measuring channel.

Alternatively or additionally, it is preferably provided that a pressure measuring device, in particular a manometer, is operatively connected to the pressure measuring channel in order to measure the pressure in the pressure measuring channel. In this way, the pressure in the hollow channel, the pressure chamber and in the medical hollow body can be determined at the same time.

According to a further development of the invention, it is provided that a piston is displaceably arranged in the pressure chamber, so that a volume of the pressure chamber can be changed by displacing the piston. In this way, the pressure in the pressure chamber can be adjusted very easily by displacing the piston. In particular, the piston is arranged in the pressure chamber in a linearly displaceable manner, preferably in the axial direction. The piston is preferably in close contact with an inner circumferential surface of the pressure chamber, so that when the piston is displaced in the pressure chamber, the pressure therein is changed.

An axial direction is preferably in particular a direction that extends parallel to or in the direction of the longitudinal axis of the hollow channel. When installed, the longitudinal axis of the hollow channel is preferably aligned with the longitudinal axis of the medical hollow body. When installed, the longitudinal axis of the hollow channel is preferably aligned with the displacement axis of the working end of the tension/compression measuring device. In a particularly preferred embodiment, the axial direction thus extends along the longitudinal axis of the hollow channel and along the longitudinal axis of the medical hollow body and along the displacement direction of the working end of the tension/compression measuring device. A radial direction is perpendicular to the axial direction. A circumferential direction concentrically encompasses the axial direction.

According to a further development of the invention, it is provided that the adapter part has a piston, which is designed to be displaceably arranged in the pressure chamber. The piston can therefore be provided separately from the pressure chamber at least when not installed and, if necessary, be arranged displaceably therein in order to change the volume of the pressure chamber by displacing the piston, which at the same time changes the pressure in the pressure chamber. In particular, the piston can preferably be operatively connected to the working end of the tension/compression measuring device.

However, it is also possible for the piston to be held captive in the pressure chamber.

According to a further development of the invention, it is provided that the piston has a piston disk. Alternatively, it is possible for the piston to be designed as a piston disk. The latter represents a particularly simple embodiment of the piston. In this case, it is in particular possible for the working end of the tension/compression machine to act on the piston, which is designed as a piston disk, in order to displace said piston in the pressure chamber.

If the piston has a piston disk, it preferably also has a piston rod that is connected to the piston disk, in particular designed in one piece with the piston disk. The piston rod preferably protrudes from the pressure chamber in some regions in order to be connected to the working end of the tension/compression measuring device. If the piston rod passes through an in particular axial opening, in particular a bore, the clear diameter of which is smaller than the diameter of the piston disk, the piston is arranged captively in the pressure chamber, it being possible for the part of the piston rod located outside the pressure chamber to be connected to the working end of the tension/compression measuring device at the same time.

Alternatively or additionally, the piston has a coupling part that is designed to be mechanically coupled to the working end of the tension/compression measuring device. In particular, it is possible for the piston rod to have the coupling part. If the piston having the coupling part is mechanically coupled to the working end, it can be displaced together with the working end.

A securing bore, preferably a transverse bore, which extends transversely, in particular perpendicularly to the axial direction, is preferably arranged on the coupling part of the piston for the passage of a securing pin. The coupling shaft can thus be connected to the working end of the tension/compression measuring device in a particularly secure manner by inserting a securing pin through the securing bore. The working end of the tension/compression measuring device preferably has a securing receptacle for the securing pin, so that, when installed, said securing pin extends through the securing receptacle on the one hand and the securing bore on the other hand and thus securely holds the piston at the working end.

According to a preferred embodiment, the coupling part is designed as a coupling shaft. A coupling shaft is understood to be, in particular, a shaft of the piston that is specifically designed for mechanical coupling with the working end. In particular, the piston rod is preferably designed as a coupling shaft.

According to a further development of the invention, it is provided that the pressure chamber and/or the piston is assigned a scale from which an instantaneous pressure in the pressure chamber can be read depending on an instantaneous position, in particular an instantaneous axial position, of the piston in the pressure chamber. This allows, in a very simple manner, an at least rough estimate of the pressure in the pressure chamber, as well as a plausibility check as to whether the pressure ultimately set/monitored as part of the tightness test is correct.

The scale preferably allows the pressure to be read from the scale as a function of the instantaneous position of the piston relative to a starting position of the piston. It is therefore in particular preferred to first check from which position the piston starts on the scale under ambient pressure in the pressure chamber when said piston is initially displaced by the tension/compression measuring device in order to change the pressure in the pressure chamber differently from the ambient pressure. The target position of the piston on the scale, which said piston reaches after the displacement, then gives a measure relative to the starting position of the pressure difference between the pressure reached and the starting pressure, i.e. the ambient pressure.

It should be understood that the change in pressure in the event of an axial displacement of the piston is in particular dependent on the volume of the medical hollow body and of the hollow channel and the pressure chamber. The volume of the medical hollow body in particular typically varies, while the volume of the hollow channel and the pressure chamber is predetermined for a specific adapter part. Different scales for different medical hollow bodies to be tested can be provided on the adapter part. Alternatively, it is possible for a conversion table to be provided that takes into account the volume of the currently checked medical hollow body. Alternatively, it is possible for different adapter parts—in particular having different scales—to be provided for different medical hollow bodies.

The scale is preferably arranged on a wall of the pressure chamber. The wall of the pressure chamber is particularly preferably transparent, at least in the region of the scale, so that the position of the piston relative to the scale can be observed through the wall.

If the scale is assigned to the piston, the wall of the pressure chamber preferably has a reading mark.

The object is also achieved in that a test assembly that has a tension/compression measuring device is created. The tension/compression measuring device has a standing body and a working end that can be axially displaced relative to the standing body, in particular an axially displaceable measuring element. In particular, the tension/compression measuring device is designed as has already been explained above in connection with the adapter part. The test assembly also has an adapter part according to the invention or an adapter part according to any of the embodiments described above. The second connecting end of the adapter part is operatively connected to the working end in such a way that a pressure in the pressure chamber of the adapter part can be adjusted by axially displacing the working end relative to the pressure chamber. The advantages that have already been explained in the context of the adapter part are in particular achieved with the test assembly.

The tension/compression measuring device preferably has a drive, in particular a machine or motor drive, for displacing the working end. In a particularly preferred embodiment, the drive is designed as an electric motor—optionally with the interposition of a transmission. The drive can in particular be assigned to the standing body or be arranged in the standing body.

The working end is preferably axially displaceable on a measuring tower of the standing body. It is possible for at least parts of the drive to be arranged in the measuring tower or integrated in the measuring tower. The working end can in particular be axially displaced relative to the measuring tower and on the measuring tower.

According to a further development of the invention, it is provided that the standing body has a fastening part for fixing the adapter part relative to the standing body. In particular, the fastening part is designed to be fastened to the standing body on the one hand and to be connected in a fixed position to the adapter part on the other hand, so that the adapter part is ultimately arranged in a fixed position relative to the standing body via the fastening part.

The standing body also preferably has a test body fastening part for fixing the medical hollow body relative to the standing body. In this case, the test body fastening part can preferably be connected to the stand body in a fixed position, while the hollow medical body can be connected to the test body fastening part in a fixed position, so that the medical hollow body is ultimately arranged in a fixed position relative to the standing body via the test body fastening part.

According to a further development of the invention, it is provided that the working end, in particular the measuring element, is connected to the piston, in particular the piston disk, of the adapter part in a tension and/or pressure-transmitting manner. In this case, a pressure-transmitting connection can come about in a particularly simple manner in that the working end presses on the piston disk without otherwise being mechanically connected thereto. However, it is also possible for the working end to be connected to the piston disk in a tension and pressure-transmitting manner, for example latched to the piston disk or mechanically connected thereto in some other way.

Alternatively, it is preferably provided that the working end is mechanically coupled—in particular rigidly—to a coupling part of the piston. The coupling part can in particular be a coupling shaft. It is possible for the working end to be connected to the coupling part in a secured manner via a securing pin, the securing pin preferably passing through a securing bore on the coupling part and a securing receptacle on the working end.

Alternatively, it is preferably provided that the working end itself is arranged displaceably as a piston in the pressure chamber. In particular, it is possible for the dimensions of the pressure chamber, in particular the diameter thereof, to be matched to the working end, so that the working end itself can be used as a piston and can be displaced directly in the pressure chamber without any further coupling to a separate piston to change the pressure in the pressure chamber. This represents a particularly simple embodiment having particularly few parts.

According to a further development of the invention, it is provided that the tension/compression measuring device has a control device, which is designed to be operatively connected to a pressure measuring device, in particular a manometer, and to record, preferably as a function of time, and preferably evaluate a pressure in the hollow channel, in particular in the pressure measuring channel. This allows an at least partially automated implementation of a tightness test, it being possible for the control device of the tension/compression measuring device to take over the recording and preferable evaluation of the pressure in the hollow channel, in particular in the pressure measuring channel.

The working end can preferably be displaced by the control device as a function of the recorded pressure. This allows the pressure to be adjusted automatically, in particular to a default or target value.

According to a further development of the invention, it is provided that the control device is designed to carry out a tightness test on a medical hollow body in an automated manner. This allows a particularly simple, time-saving and personnel-saving execution of the tightness test. Preferably, the pressure in the pressure chamber is initially adjusted automatically, then recorded during a predetermined period of time, and finally the pressure recorded during the predetermined period of time, in particular the pressure curve, is evaluated.

Alternatively, it is possible for the control device to be designed to regulate the pressure in the hollow channel, in particular in the pressure measuring channel, the working end in particular being displaced as a function of the recorded pressure in such a way that the pressure in the hollow channel, in particular in the pressure measuring channel, is kept constant. Depending on control interventions carried out during a predetermined period of time, in particular depending on a displacement path of the working end, it is then possible to conclude that the medical hollow body is tight or leaking.

The object is also achieved in that a method for checking the tightness of a medical hollow body is created, a medical hollow body being connected to a tension/compression measuring device via an adapter part according to the invention or an adapter part according to any of the embodiments described above. The medical hollow body is closed in particular at its end facing away from the adapter part, in particular by means of a stopper or closure. Ultimately, the method allows the tightness of the stopper or closure to be tested at the end of the medical hollow body that faces away from the adapter part. A certain pressure is set in the interior of the medical hollow body by displacing the working end of the tension/compression measuring device. In this case, an overpressure or an underpressure can preferably be set, in particular depending on the tightness test to be carried out. The working end is displaced in particular relative to the adapter part and relative to the medical hollow body. An instantaneous pressure in the interior of the medical hollow body is recorded over a specific test time. In connection with the method, the advantages already described in particular are realized.

The method is preferably carried out in accordance with the specifications of the DIN EN ISO 80369-20:2015 standard.

The instantaneous pressure in the interior is preferably recorded by the tension/compression measuring device during the specific test time. The recorded instantaneous pressure is preferably evaluated, in particular as a pressure curve over time. The evaluation is preferably carried out by the tension/compression measuring device, in particular by the control device of the tension/compression measuring device.

According to a further development of the invention, it is provided that the working end is kept still after the specific pressure has been set and during the specific test time. In this case, a specific pressure is initially set, a check then being made as to whether the pressure changes more during the specific test time than is permitted in accordance with a target specification. If the pressure change remains within the target specification, the tested medical hollow body is considered to be tight. If the pressure change exceeds the target specification, the tested medical hollow body is considered to be leaking. The working end is held stationary in particular relative to the adapter part and the medical hollow body.

Alternatively, it is possible for the pressure in the medical hollow body to be regulated to the specific pressure as the target value during the specific test time. Control interventions, in particular displacements of the working end, are preferably evaluated during the specific test time, and conclusions are drawn as to the tightness of the medical hollow body on the basis of these control interventions and/or displacements of the working end. If the control interventions and/or the displacements of the working end exceed a target specification, the medical hollow body is considered to be leaking, otherwise it is considered to be tight.

The method is preferably carried out automatically by the tension/compression measuring device. In particular, only a manual connection of the medical hollow body to the tension/compression measuring device via the adapter part is required. In addition, the specific pressure can be adjusted automatically by the tension/compression measuring device, and the instantaneous pressure in the interior of the medical hollow body can be automatically recorded and preferably evaluated over the specific test time. Accordingly, an automatic readjustment of the specific pressure and an evaluation of the necessary control interventions and/or displacements of the working end can also take place.

According to a further development of the invention, it is provided that the medical hollow body is checked before a medical stopper is arranged in the medical hollow body. In particular, the medical hollow body is checked before a central stopper—for a two-chamber hollow body—or an end stopper is/are arranged in a syringe or carpule. At the time of the test, the medical hollow body is thus free of a stopper that can be displaced in the interior of the medical hollow body, in particular free of a central and/or end stopper.

The tightness test of the medical hollow body can in particular take place before siliconization of an inner wall of the medical hollow body, but also after siliconization. The test before siliconization is possible because the tightness test is carried out without a stopper that can be displaced in the interior of the medical hollow body. This allows, in particular, an earlier tightness test in the manufacturing process of the medical hollow body, which has logistical advantages. Because the tightness test can be carried out without a stopper, the results of the test are not influenced by breakaway and/or sliding frictional forces of such a stopper.

The object is finally also achieved in that a use of a tension/compression measuring device for testing the tightness of a medical hollow body is provided. In accordance with the present disclosure, a tension/compression measuring device can advantageously be used in order to test the tightness of a medical hollow body. In particular, the advantages already mentioned are realized here.

The invention is explained in greater detail below with reference to the drawing. In the drawing:

FIG. 1 is a schematic representation of a first embodiment of a test assembly with an embodiment of an adapter part;

FIG. 2 is a schematic sectional view of the test assembly according to FIG. 1.

Figure 3:
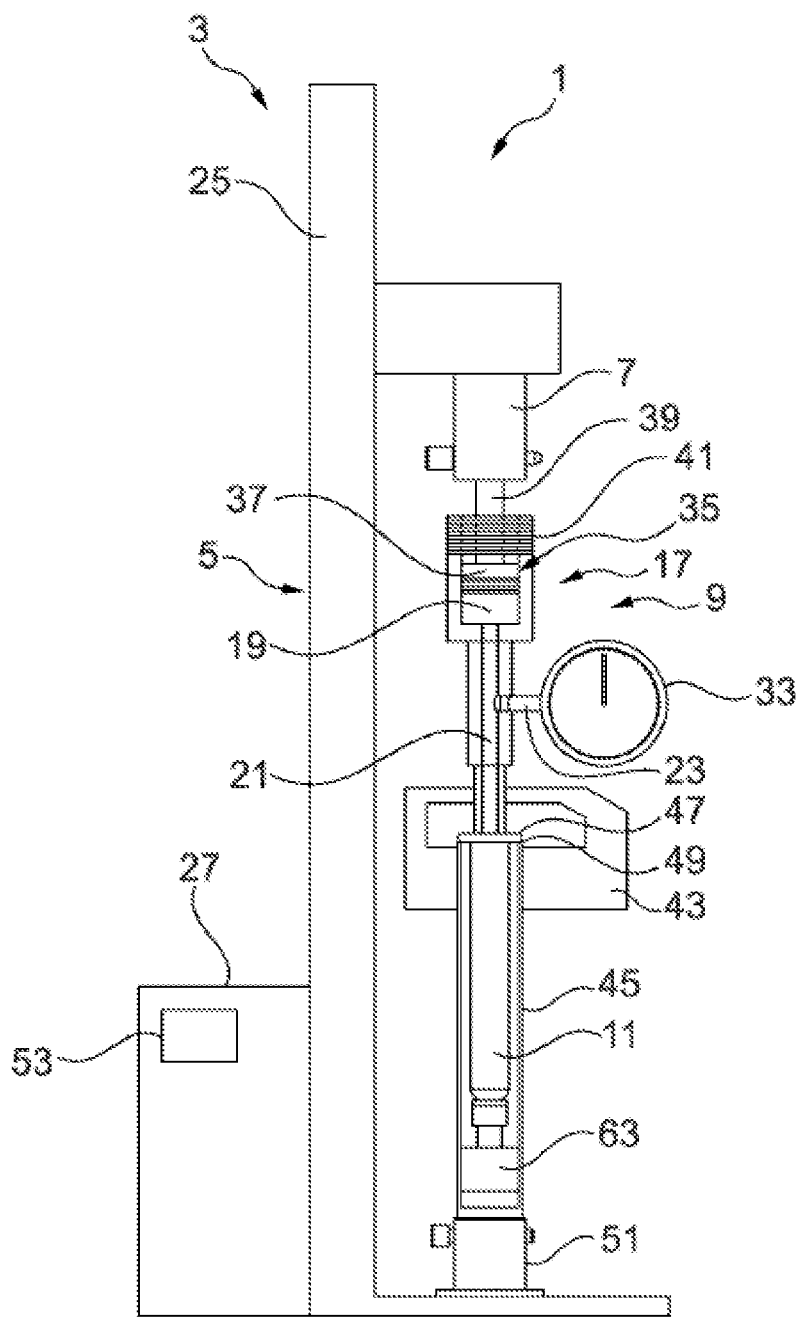
FIG. 3 is a schematic representation of a second embodiment of a test assembly.

FIG. 1 is a representation of a first embodiment of a test assembly 1, which has a tension/compression measuring device 3. The tension/compression measuring device 3, for its part, has a standing body 5 and a working end 7 that can be axially displaced relative to the standing body 5, i.e. in the vertical direction with reference to FIG. 1. Furthermore, the test assembly 1 has an adapter part 9, which is designed to connect a medical hollow body 11 to the tension/compression measuring device 3. The adapter part 9 has a first connecting end 13, shown in FIG. 2, which is designed to connect the adapter part 9 in a fluid-tight manner to an interior 15 of the medical hollow body 11, also shown in FIG. 2. The adapter part 9 also has a second connecting end 17. The second connecting end 17 has a pressure chamber 19 and is designed to operatively connect the adapter part 9 to the tension/compression measuring device 3, so that a pressure in the pressure chamber 19 can be adjusted by means of the tension/compression measuring device 3.

The adapter part 9 also has a hollow channel 21, which passes through said adapter part from the pressure chamber 9 to the first connecting end 13.

In addition, the embodiment of the adapter part 9 shown here has a pressure measuring channel 23, which branches off from the hollow channel 21 or the pressure chamber 19, in this case from the hollow channel 21, between the first connecting end 13 and the second connecting end 17.

The second connecting end 17 is operatively connected to the working end 7 of the tension/compression measuring device 3 in such a way that a pressure in the pressure chamber 19 can be adjusted by axially displacing the working end 7 relative to the pressure chamber 19.

In this way, a precise pressure setting in the pressure chamber 19 and thus ultimately also in the interior 15 of the medical hollow body 11 can be carried out in a simple manner by means of the tension/compression measuring device 3, which can be used for a tightness test of the medical hollow body 11. It is thus ultimately possible to use a device for this tightness test that is already used to test medical hollow bodies 11, namely the tension/compression measuring device 3, which is used regularly, for example, to measure breakaway forces or displacement forces of stoppers in medical hollow bodies 11.

The standing body 5 preferably has a measuring tower 25 on which the working end 7 can be displaced. For this purpose, the tension/compression measuring device 3 preferably has a drive 27, which is designed to displace the working end 7 in the axial direction, in particular on the measuring tower 25.

The working end 7 is preferably designed as a measuring element or has a measuring element. However, it is also possible for the working end 7 to be designed purely as a mechanical component or mechanical adapter, in particular as a mechanical connecting part for attaching further parts, in particular measuring arrangements, for example load cells, to the tension/compression measuring device 3.

The first connecting end 13 is preferably assigned a sealing device 29 that is designed to seal the fluidic connection between the hollow channel 21 and the interior 15 of the medical hollow body 11. For this purpose, the sealing device 29 preferably has at least one sealing element, in this case specifically two sealing rings 31, 31', which are arranged on the first connecting end 13, in particular encompassing the first connecting end 13 in the circumferential direction.

The hollow channel 21 is open in particular at the first connecting end 13. In particular, said hollow channel opens into the first connecting end 13, or it opens into the interior 15 of the medical hollow body 11 in the region of the first connecting end 13 when the adapter part 9 is connected to the medical hollow body 11.

By means of the tension/compression measuring device 3 and the adapter part 9, both an overpressure and an underpressure can be set in the interior 15 of the medical hollow body 11, compared to an ambient pressure in the vicinity of the medical hollow body 11.

A pressure measuring device 33, which can in particular be designed as a manometer, is arranged on the pressure measuring channel 23. The pressure measuring channel 23 is preferably designed for connection to the pressure measuring device 33, for example by having a thread into which the pressure measuring device 33 can be screwed or to which the pressure measuring device 33 can be screwed.

The pressure measuring device 33 is operatively connected to the pressure measuring channel 23 in order to measure a pressure in the pressure measuring channel 23 and thus at the same time in the hollow channel 21, the pressure chamber 19 and the medical hollow body 11.

Alternatively, the pressure measuring device can also be connected to a distal end of the hollow body 11 in order to measure the pressure in the interior of the hollow body 11. In this case, an adapter part 9 can also be used that does not have a pressure measuring channel 23 or in which the pressure measuring channel 23 is closed, for example, with a blind stopper.

A distal end is understood here in particular to be an end of the hollow body 11 that, when the hollow body 11 is used, faces toward a patient and/or an injection site and preferably faces away from a user of the hollow body 11 as intended. The other end of the hollow body 11 is referred to as the proximal end.

A piston 35 is displaceably arranged in the pressure chamber 19, so that a volume of the pressure chamber 19 can be changed by displacing the piston 35. Alternatively, it is also possible for the adapter part 9 to have a piston, which is designed to be displaceably arranged in the pressure chamber 19. In particular, the piston 35 therefore does not have to be arranged permanently in the pressure chamber 19; in particular, there is no need for a captive, possibly inseparable, arrangement of the piston in the pressure chamber 19. However, it is possible for the piston 35 to be arranged permanently, in particular in a captive manner, in the pressure chamber 19.

The piston 35 preferably has a piston disk 37. Said piston disk is preferably arranged tightly in the pressure chamber 19, preferably by means of at least one sealing ring, which the piston disk 37 carries, in particular on the circumference thereof. According to one embodiment, it is possible for the piston 35 as a whole to be designed as a piston disk 37. In this case, the working end 7 preferably acts directly on the piston disk 37.

In the embodiment shown here, however, the piston 35 has a coupling part 39 that is designed to be mechanically coupled to the working end 7. The coupling part 39 is designed in particular as a coupling shaft. Said coupling shaft is preferably rigidly connected to the coupling disk 37, in particular so that it can be carried along. In particular, it is possible for the coupling part 39 and the coupling disk 37 to be formed in one piece, in particular from the same material, with one another and thus jointly form the piston 35 in one piece.

If the coupling part 39 is coupled to the working end 7, these can in particular be displaced together, so that the piston 35 as a whole is displaced together with the working end 7 when the latter is displaced. In this way, the volume in the pressure chamber 19 can be adjusted by moving the working end 7 and thus at the same time the piston 35. At the same time, this leads to an adjustment of the pressure in the hollow channel 21 and in the medical hollow body 11 when said medical hollow body is connected to the adapter part 9.

In the embodiment shown here, the pressure chamber 19 is assigned a scale 41 from which an instantaneous pressure in the pressure chamber 19 can be read depending on an instantaneous—axial—position of the piston 35 in the pressure chamber 19. In particular, the scale 41 is preferably arranged on an outer circumference of the pressure chamber 19, in particular glued or printed thereon, or attached in another suitable manner so that it can be read. In particular, a wall of the pressure chamber 19 is preferably transparent, at least in the region of the scale 41, so that the position of the piston 35 relative to the scale 41 can be observed through the wall of the pressure chamber 19.

Alternatively, it is possible for the piston 35 to be assigned a corresponding scale. The wall of the pressure chamber 19 then preferably has a reading mark.

According to a preferred embodiment, the standing body 5 has a fastening part 43, which is designed to fasten the adapter part 9 relative to the standing body 5 and preferably to the standing body 5. However, it is also possible for the adapter part 9 to be held in a particularly simple manner on the one hand by the working end 7 and on the other hand by the medical hollow body 11.

In this case, the medical hollow body 11 is arranged in a holder 45 which is substantially designed as a cylindrical hollow body into which the medical hollow body 11 can be introduced. In this embodiment, the medical hollow body 11 rests with a finger rest 47 on an upper edge 49 of the holder 45. The holder 45 is, for its part, fixed on a fastening foot 51 of the tension/compression measuring device 3, which can preferably be part of the standing body 5.

The fastening part 43 can also be connected to the holder 45 and/or the fastening foot 51.

As already stated, the working end 7 is in this case mechanically coupled to the coupling part 39 of the piston 35. Alternatively, however, it is also possible for the working end 7 to be directly connected in a tension and/or pressure-transmitting manner to the piston disk 37 or to a piston disk to which no coupling part 39 is assigned. In particular, the working end 7 can act directly on the piston disk 37. Furthermore, it is alternatively possible for the working end 7 itself to be displaceable as a piston in the pressure chamber 19.

The tension/compression measuring device 3 preferably has a control device 53, which is designed to be operatively connected to the pressure measuring device 33 and to record a pressure in the hollow channel 21, in particular in the pressure measuring channel 23, preferably as a function of time. The control device 53 is further preferably designed to evaluate the recorded pressure—in particular as a function of time. According to a preferred embodiment, it is possible for the control device 53 to be further designed to displace the working end 7 as a function of the recorded pressure, in particular in order to be able to automatically adjust the pressure in the hollow channel 21 and ultimately in the medical hollow body 11, in particular to a predetermined pressure value. It is also possible for the control device 53 to be designed according to a preferred embodiment to regulate the pressure in the hollow channel 21 to a predetermined target value. The control device 53 is also designed to carry out a tightness test of the medical hollow body 11 in an automated manner.

FIG. 2 shows a schematic sectional view of the test assembly 1 according to FIG. 1. Identical and functionally identical elements are provided with the same reference symbols in all figures, so that in this respect reference is made to the preceding description.

In this case, the coupling part 39 has in particular a transverse bore 55 as a securing bore, which, when installed, is aligned with a securing receptacle 57 of the working end 7. A securing pin 59 is inserted through the transverse bore 55 and the securing receptacle 57, which is preferably also designed as a transverse bore, by means of which securing pin the piston 35 is ultimately mechanically connected to the working end 7.

In an analogous manner, the holder 45 is in this case also connected to the fastening foot 51 via a second securing pin 61.

The medical hollow body 11 is in this case closed at its distal end with a closure 63, in particular in a fluid-tight manner.

The medical hollow body 11 preferably does not lie tightly on the upper edge 49 of the holder 45 with its finger rest 47, or the holder 45 has at least one pressure equalization bore, which allows pressure equalization with an external environment of the holder 45. This preferably ensures that an interior of the holder 45 always has ambient pressure, which allows the tightness of the medical hollow body 11 to be tested as precisely as possible.

FIG. 3 shows a schematic representation of a second embodiment of a test assembly 1. The fastening part 43 is connected to the holder 45 here.

The method for testing the tightness of the medical hollow body, which is explained in more detail below with reference to all FIGS. 1 to 3 is used in particular to test the tightness of the closure 63, i.e. in particular to connect the closure 63 to the medical hollow body 11.

According to a preferred embodiment, the medical hollow body 11 is tested for tightness with the aid of the test assembly 1 in the following way:

First, the medical hollow body 11 is connected to the tension/compression measuring device 3 via the adapter part 9. The medical hollow body 11 is closed in particular at the distal end thereof, in this case by means of the closure 63. A certain pressure is now set in the interior 15 of the medical hollow body 11 by displacing the working end 7, and an instantaneous pressure in the interior 15 is recorded over a certain test time. This pressure recording takes place— preferably as a function of time—preferably by means of the tension/compression measuring device 3, in particular by means of the control device 53 thereof.

The pressure recorded in this way is preferably evaluated, particularly preferably also by the tension/compression measuring device 3, in particular by the control device 53 thereof.

The working end 7 is preferably kept still after the specific pressure has been set and during the specific test time. Recording is then carried out in particular to determine whether the pressure in the interior 15 is changing, in particular whether said pressure is increasing, in particular if an underpressure was previously set in the interior 15, or whether said pressure is decreasing, in particular if an overpressure was previously set in the interior 15. A leakage rate and/or a tightness of the medical hollow body 11 can then be deduced from the detected pressure change.

However, it is also possible for the pressure in the interior 15 to be regulated over the specific test time by the tension/ compression measuring device 3, in particular the control device 53, in particular to a predetermined target pressure value. In this case, the control signals or adjustment paths of the tension/compression measuring device 3, in particular of the working end 7, can be evaluated with regard to a leakage rate and thus ultimately the tightness of the medical hollow body 11. In this respect, it is obvious that there is a higher readjustment effort when the medical hollow body 11 is leaking, or that the readjustment effort is greater the higher the leakage rate is. In the optimal case, with a vanishing leakage rate, no readjustment is required.

The method for checking the tightness of the medical hollow body 11 is preferably carried out automatically or in an automated manner by the tension/compression measuring device 3, in particular without the need for user intervention.

The medical hollow body 11 is preferably checked before a medical stopper, in particular a central and/or end stopper, is arranged in the medical hollow body 11. The medical hollow body 11 can in particular be checked for tightness before or after siliconization. Such siliconization takes place in particular in order to increase the sliding ability of a central and/or end stopper in the interior 15 of the medical hollow body 11.

It is clear that, according to the technical teaching disclosed here, in particular a tension/compression measuring device 3 is used to test the tightness of a medical hollow body 11.

The invention claimed is:

1. A test assembly (1), comprising
a tension/pressure measuring device (3) comprising a control device (53), which is designed to be operatively connected to a pressure measuring device (33) and to record a pressure in a hollow channel (21), the tension/ pressure measuring device (3) having a standing body (5) and a working end (7), the working end (7) being axially displaced relative to the standing body (5), and comprising:
an adapter part (9), wherein the adapter part (9) comprises:
  a first connecting end (13), which is designed to connect the adapter part (9) to an interior (15) of a medical hollow body (11) in a fluid-tight manner;
  a second connecting end (17), which has a pressure chamber (19) and is designed to operatively connect the adapter part (9) to the tension/pressure measuring device (3), so that a pressure in the pressure chamber (19) can be adjusted by means of the tension/pressure measuring device (3);
  and the hollow channel (21) passing through the adapter part (9) from the pressure chamber (19) to the first connecting end (13)
the second connecting end (17) of the adapter part (9) being operatively connected to the working end (7) in such a way that a pressure in the pressure chamber (19) is adjusted by axially displacing the working end (7) relative to the pressure chamber (19).

2. The test assembly (1) according to claim 1, characterized by a pressure measuring channel (23), which branches off from the hollow channel (21) or the pressure chamber (19) between the first connecting end (13) and the second connecting end (17).

3. The test assembly (1) according to claim 1, characterized in that:
a) a piston (35) is displaceably arranged in the pressure chamber (19), so that a volume of the pressure chamber (19) can be changed by displacing the piston (35), or in that
b) the adapter part (9) has a piston (35), which is designed to be displaceably arranged in the pressure chamber (19).

4. The test assembly (1) according to claim 3, characterized in that the piston (35):

a) has a piston disk (37) or is designed as a piston disk (37), and/or b) has a coupling part (39), which is designed to be mechanically coupled to a working end (7) of a tension/pressure measuring device (3).

5. The test assembly (1) according to claim 3, characterized in that the pressure chamber (19) and/or the piston (35) is assigned a scale (41) from which an instantaneous pressure in the pressure chamber (19) can be read depending on an instantaneous position of the piston (35) in the pressure chamber (19).

6. The test assembly (1) according to claim 1, characterized in that the standing body (5) has a fastening part (43) for fixing the adapter part (9) relative to the standing body (5).

7. The test assembly (1) according to claim 1, characterized in that the working end (7) is:

a) connected to a piston disk (37) of the adapter part (9) in a tension- and/or pressure-transmitting manner, or b) mechanically coupled to a coupling part (39) of a piston (35), or c) arranged displaceably as a piston in the pressure chamber (19).

8. The test assembly (1) according to claim 1, characterized in that the control device (53) is designed to carry out a tightness test of a medical hollow body (11) in an automated manner.

9. The test assembly (1) according to claim 1, wherein:

a pressure measuring device (33) is operatively connected to a pressure measuring channel (23) in order to measure a pressure in the pressure measuring channel (23).

10. The test assembly (1) according to claim 1, characterized in that the control device (53) is additionally designed to evaluate the pressure in the hollow channel (21).

11. The test assembly (1) according to claim 1, further comprising a sealing device (29) of the first connecting end (13), wherein the sealing device (29) comprises two sealing rings (31, 31') arranged in a circumferential direction.

12. A method for testing the tightness of a medical hollow body (11), comprising the following steps:

operatively connecting a control device (53) of a tension/pressure measuring device (3) to a pressure measuring device (33) of the tension/pressure measuring device (3);

connecting a medical hollow body (11) to the tension/pressure measuring device (3) via a portion of test assembly (1) according to claim 6;

setting a specific pressure in an interior (15) of the medical hollow body (11) by displacing the working end (7) of the tension/pressure measuring device (3) and recording an instantaneous pressure in the hollow channel (21) of the interior (15) over a specific test time.

13. The method according to claim 12, characterized in that the working end (7) is kept still after the specific pressure has been set and during the specific test time.

14. The method according to claim 12, characterized in that the method is carried out automatically by the tension/pressure measuring device (3).

15. The method according to claim 12, characterized in that the medical hollow body (11) is checked before a medical stopper is arranged in the medical hollow body (11).

\* \* \* \* \*